United States Patent
Koenig et al.

(10) Patent No.: US 10,136,630 B2
(45) Date of Patent: Nov. 27, 2018

(54) HORSESHOE

(71) Applicant: Franz Koenig, Heiligenkreuz i.L. (AT)

(72) Inventors: Franz Koenig, Heiligenkreuz i.L. (AT); Rudolf Danner, Fuerstenfeld (AT)

(73) Assignee: Franz Koenig, Heiligenkreuz I.L. (AT)

( * ) Notice: Subject to any disclaimer, the term of this patent is extended or adjusted under 35 U.S.C. 154(b) by 84 days.

(21) Appl. No.: 14/764,647

(22) PCT Filed: Jan. 8, 2014

(86) PCT No.: PCT/AT2014/000001
§ 371 (c)(1),
(2) Date: Jul. 30, 2015

(87) PCT Pub. No.: WO2014/117187
PCT Pub. Date: Aug. 7, 2014

(65) Prior Publication Data
US 2015/0366181 A1  Dec. 24, 2015

(30) Foreign Application Priority Data
Jan. 30, 2013 (AT) .................. GM25/2013

(51) Int. Cl.
*A01L 1/04* (2006.01)
*A01L 5/00* (2006.01)
(52) U.S. Cl.
CPC .. *A01L 1/04* (2013.01); *A01L 5/00* (2013.01)
(58) Field of Classification Search
CPC ..... A01L 1/00; A01L 1/04; A01L 3/04; A01L 5/00

(Continued)

(56) References Cited

U.S. PATENT DOCUMENTS

| 44,009 | A | * | 8/1864 | Mallett | ............. A01L 1/04 168/7 |
| 382,131 | A | * | 5/1888 | Bingham | ............. A01L 1/04 168/7 |

(Continued)

FOREIGN PATENT DOCUMENTS

| DE | 4233 | 3/1879 |
| DE | 60568 | 1/1891 |

(Continued)

OTHER PUBLICATIONS

English-language translation of FR 2901959.*

(Continued)

*Primary Examiner* — Lisa L Tsang
(74) *Attorney, Agent, or Firm* — Jacobson Holman, PLLC.

(57) ABSTRACT

In a horseshoe for the hooves of riding animals, comprising a horseshoe-shaped base body having a running side and a hoof application side, and optionally at least one upstand fixed to the base body, and two rear end parts of the horseshoe, which are movably fixed to the base body via joint connections, the base body forming the running side of the horseshoe and the movably fixed end parts forming parts of the hoof application side, the joint connections are movable relative to each other in the plane of the hoof application side of the horseshoe, and the joint connections are each overlapped on an outer side of the horseshoe by an element exerting a restoring force onto the movable end parts.

7 Claims, 4 Drawing Sheets

(58) Field of Classification Search
USPC .......................................... 168/4, 6, 7, 8, 12
See application file for complete search history.

(56) References Cited

U.S. PATENT DOCUMENTS

| | | | | |
|---|---|---|---|---|
| 526,049 | A * | 9/1894 | Poupard | A01L 1/04 168/7 |
| 800,239 | A * | 9/1905 | Paul | A01L 1/04 168/8 |
| 1,155,293 | A * | 9/1915 | Wilson | A01L 1/04 168/11 |
| 1,716,410 | A * | 6/1929 | Austermann | A01L 1/04 168/7 |
| 3,841,408 | A * | 10/1974 | Bucalo | A01L 1/04 168/24 |
| 3,913,679 | A * | 10/1975 | Bucalo | A01L 1/04 168/24 |
| 6,076,607 | A | 6/2000 | Bergeleen | |
| 2002/0189823 | A1 * | 12/2002 | Miller | A01L 3/04 168/24 |
| 2007/0181314 | A1 * | 8/2007 | McKinlay | A01L 7/02 168/12 |
| 2010/0276163 | A1 * | 11/2010 | Berghorn | A01L 1/04 168/4 |
| 2012/0168183 | A1 * | 7/2012 | Mahidhara | A01L 1/02 168/6 |
| 2012/0222871 | A1 * | 9/2012 | Mahidhara | A01L 1/02 168/6 |
| 2014/0262353 | A1 * | 9/2014 | Bergeleen | A01L 3/00 168/11 |

FOREIGN PATENT DOCUMENTS

| | | |
|---|---|---|
| DE | 92165 | 9/1896 |
| DE | 297 18 933 | 1/1998 |
| FR | 483 953 | 8/1917 |
| FR | 2 901 959 | 12/2007 |

OTHER PUBLICATIONS

English-language translation of DE 60568.*
International Search Report, dated May 22, 2014.
Written Opinion of the International Searching Authority, dated May 22, 2014, w/ English translation.

* cited by examiner

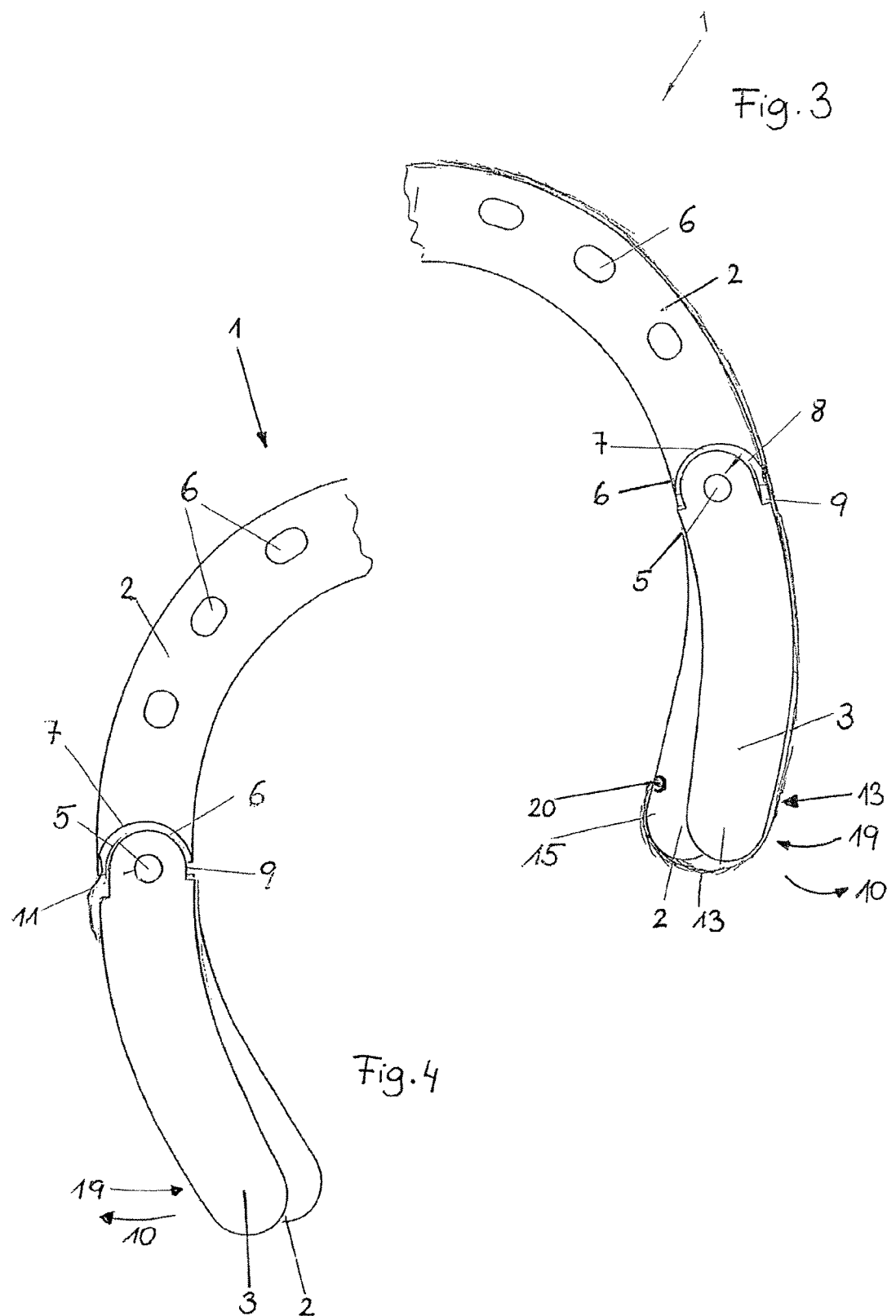

HORSESHOE

BRIEF SUMMARY OF THE INVENTION

The present invention relates to a horseshoe for the hooves of riding animals, comprising a horseshoe-shaped base body having a running side and a hoof application side, and optionally at least one upstand fixed to the base body, and two rear end parts of the horseshoe, which are movably fixed to the base body via joint connections, the base body forming the running side of the horseshoe and the movably fixed end parts forming parts of the hoof application side.

BACKGROUND OF THE INVENTION

Horseshoes have been used since ancient times for the protection of the hooves of riding animals from excessive wear, the shape predominantly used today of a horseshoe to be nailed to the hoof of a riding animal not having substantially changed since the Middle Ages.

At present, horseshoes are available in various configurations to achieve specific orthopedic effects, and also various materials such as steel, iron, aluminum and even plastics as well as combinations of the aforementioned materials, in order to provide the required softness or elasticity of the shoe or hoof protection, on the one hand, and to prevent excessive wear, on the other hand. In order to improve said orthopedic effect, and protect the hoof of the riding animal to the greatest extent possible, horseshoes, in particular horseshoes made of plastic, have recently also been glued to the hooves of a riding animal. The elasticity between the hoof and the hoof protection, however, cannot or not substantially be increased by a glued horseshoe, either.

By "horseshoe", any type of hoof protection that can be applied to the hoof of a riding animal is understood here, irrespectively of whether it is nailed or glued and irrespective of the material of which it is made.

In order to increase the flexibility of a horseshoe, metal parts resulting in the shape of a horseshoe when joined together were inserted in a plastic shell according to DE 33 44 095, and said metal parts were vulcanized into the horseshoe-shaped elastomer ring. In doing so, the parts were formed to either overlap or adjoin each other, wherein no additional connection was provided in the overlapping regions so that a certain mobility was achievable by the use of plastic.

From U.S. Pat. No. 6,076,607, a horseshoe became known, in which insert parts were inserted in the toe region or forward end region of the horseshoe to achieve a more or less high flexibility. The insertion of those parts was performed by the insertion of retaining pins or locking screws from outside.

A similar variant to increase the flexibility of a horseshoe can be taken from FR-A 483.953, in which a joint connection is provided in the toe region by means of a rivet or kind of a spherical joint in order to make the two legs of a horseshoe relatively movable.

A similar solution can also be taken from DE-C 4233, in which joints are provided in the toe region in order to make the legs of the horseshoe movable at least to a slight extent.

Finally, DE 297 18 933 U1 describes a horseshoe that is to follow the movement of the hoof during walking, wherein a joint connection is also provided there in the toe region to enable the movement of the two legs of the horseshoe relative to each other.

It is, however, impossible, in particular with shoes completely made of metal, to match the desired elasticity of the horseshoe, in particular, in combination with the hoof noticeably moving when the animal touches the ground, so that all horseshoes used so far either suffer from having an insufficient elasticity or from excessively strongly and rapidly wearing, thus requiring, in addition to the relatively high costs for the horseshoe as such, relatively frequent shoeing, or new gluing of the horseshoes to the hooves of the riding animals, which is in turn not beneficial to the hoof proper of the riding animal.

The present invention aims to provide a hoof protection, in particular horseshoes for the hooves of riding animals, by which it is possible to achieve a permanent and relatively wear-resistant shoe, on the one hand, and the necessary elasticity required for a healthy movement of the hoof of the riding animal, on the other hand.

To solve these objects, the horseshoe according to the invention is essentially characterized in that the rear end parts are movable relative to each other in the plane of the hoof application side of the horseshoe via joint connections, and that the joint connections are each overlapped on an outer side of the horseshoe by an element exerting a restoring force onto the movable end parts. In that the rear end parts are movable relative to each other in the plane of the hoof application side of the horseshoe via joint connections, the rear end parts of the horseshoe, which are movably fixed, are able to follow the movement of the hoof, in particular when the riding animal touches the ground, during which movement the hoof of the riding animal is pressed apart, and hence widens, in the region of the hoof quarters, thus causing the movably fixed, rear end parts to be moved outwards.

When the riding animal relieves its hoof again, the element provided to exert a restoring force on the movable end parts ensures that the rear end parts movably fixed to the base body are returned into their resting positions or starting positions. Such an arrangement, thus, enables the horseshoe at every step of the riding animal to safely and reliably follow the naturally occurring movements, i.e. the widening of the hoof in the region of the hoof quarters while touching the ground and its narrowing when again raising the feet.

In order to further safeguard that the elements exerting a restoring force ensure the safe return of the movably fixed, rear end parts, the invention is preferably further developed such that the elements exerting a restoring force are selected from spring elements or damping elements. When correctly positioned, such elements are able to exert pressure on the movably fixed, rear end parts, and hence move the same back into their original positions when the higher pressure exerted by the hoof of the riding animal on the movably fixed, rear end parts is reduced.

According to a preferred further development, the elements exerting a restoring force are designed as leaf springs.

Leaf springs can in this case, in particular, be safely and reliable positioned on the outer side of the horseshoe, thus causing no extension, or a minimum extension at most, of the horseshoe such that an injury of the riding animal during the use of the horseshoe will be safely excluded and any inadvertent destruction of the leaf springs, or the element providing a restoring force, by the riding animal stepping on it will, moreover, be prevented.

In that, as in correspondence with a preferred further development, the leaf springs are detachably connected to at least the base body and/or the movably fixed end parts, different leaf springs can be fixed to one and the same horseshoe to exert a higher or lower restoring force on the movably fixed end parts. In this respect, it is up to the skilled artisan, e.g. the blacksmith, to choose, and insert into the horseshoe, the respectively appropriate leaf springs. Such a configuration also enables, for instance, destroyed leaf springs to be replaced at any time without requiring new shoeing of the riding animal.

According to a further development of the invention, the horseshoe is configured such that the leaf springs are detachably fixable in blind holes formed in at least the base body. By fixing the leaf springs in blind holes of the base body, excess widening of the horseshoe to the outside will be avoided, on the one hand, and a safe and reliable support of the leaf springs within the horseshoe will, moreover, be safeguarded, on the other hand.

According to another further development of the invention, the horseshoe is preferably configured such that the leaf springs are non-detachably connected to the movably fixed, rear end parts. Such a configuration ensures that the leaf springs are captively fixed to the horseshoe, and that the horseshoe can, for instance, be worked hot for adaption to the respective hoof of the riding animal. Following hot-working of the horseshoe, it will thus only be necessary to detachably connect the free ends of the leaf springs to the base body in order to provide a fully functioning horseshoe.

All horseshoe configurations comprising leaf springs have in common that the leaf spring can either be provided externally on the horseshoe or inserted in a depression or groove of the main body or the movable part of the horseshoe so as to safely prevent any injury of the riding animal.

According to another configuration of the invention, the horseshoe is configured such that the horseshoe, on its outer side, is at least partially surrounded by at least one elastic plastic strip exerting a restoring force. In that the horseshoe, on its outer side, is at least partially surrounded by at least one elastic plastic strip exerting a restoring force, the same effect as with the above-described leaf springs will be achieved. It is thus possible at any time after the touching down of the riding animal to exert sufficient pressure on the movably fixed, rear end parts in order to bring the latter back into their basic positions. When the riding animal rises its feet again, the movably fixed, rear end parts will again be pressed outwards to beyond the outer contour of the horseshoe, thus deforming the elastic plastic band in the external direction.

Such a configuration, moreover, offers the advantage of the horseshoe always being smooth on its outer side so as to clearly reduce the risk of injury to the riding animals.

A particularly simple fixation of the plastic strip to the horseshoe is feasible according to the invention in that the ends of the at least one elastic plastic strip are fixed, in particular hooked, in recesses provided, in particular, on the inner side of the horseshoe. In that the ends of the at least one elastic plastic strip are fixed and hooked in recesses provided, in particular, on the inner side of the horseshoe, a horseshoe can be worked on, and nailed to the hoof of a riding animal, in a conventional manner and the elastic plastic strip can be passed around the horseshoe after the fixation of the latter by the blacksmith. Similarly, the plastic strip might also be fixed prior to shoeing. In this context, it should be noted that such a plastic strip can also be designed as a closed plastic strip, since, in particular in the region of the hoof quarters of the horse, silicone inserts or covers are frequently also applied for orthopedic reasons, in which case such a plastic strip would also provide a termination to the outside.

In order to safely prevent the plastic strip from slipping out of position in the region of the horseshoe and, in particular, sliding up the hoof or down from the horseshoe, the invention is preferably further developed such that at least one guide channel or guide groove is formed in the base body for the at least one elastic plastic strip. By providing a guide channel or guide groove, the plastic strip is safely prevented from slipping out of position, and it is, moreover, ensured that, for instance, no sand or small stones will penetrate between the horseshoe and the plastic strip during walking, which, on the one hand, would possibly cause excessive wear of the plastic strip and, on the other hand, could also lead to injuries of the riding animal.

In that, as in correspondence with a further development of the invention, the horseshoe is designed such that irregularities of the hoof application side possibly existing in the region of the joint connections are filled with resilient silicone or rubber inserts, a completely plane hoof application side will, furthermore, be provided so as to safely prevent any impairment of and, in particular, inadvertent pressure, in particular point pressure, on the hoof.

To this end, the invention according to a preferred further development can be configured such that the joint connections on the hoof application side are each provided with a cover element, in particular a leather or plastic cover element. By providing a cover element on the hoof application side to cover, in particular, the joint connections, it has, on the one hand, become possible to avoid any inadvertent pressure on the hoof of the riding animal in the region of the joint connections and, on the other hand, the friction-free functioning of the movably fixed, rear end parts, which are hinged to the joint, will be safeguarded. It is finally possible by such a cover element, in particular if it covers, for instance, the entire hoof region of a riding animal, to also fulfill an orthopedic purpose, for instance by a horseshoe with a silicone-foamed hoof.

In order to ensure the safe functioning of the movably fixed end parts of the horseshoe and, in particular, the friction-free movement of said movably fixed end parts on or over the base body, or track surface of the base body, either the base body and/or the movably fixed end parts according to the invention are provided with a friction-reducing coating such as a copper plating. By such a configuration, the simple and permanent working of the movably fixed end parts of the horseshoe will be ensured.

BRIEF DESCRIPTION OF THE SEVERAL VIEWS OF THE DRAWINGS

In the following, the invention will be explained in more detail by way of exemplary embodiments illustrated in the drawing, in which:

FIG. 3 is a partial view of the horseshoe according to FIG. 2, in which the movably fixed, rear end part is in a position projecting beyond the plane of the base body;

FIG. 4 is a partial view of the horseshoe according to FIG. 1, in which the movably fixed, rear end part is in a position projecting beyond the plane of the base body.

DETAILED DESCRIPTION OF THE INVENTION

Figure 1:
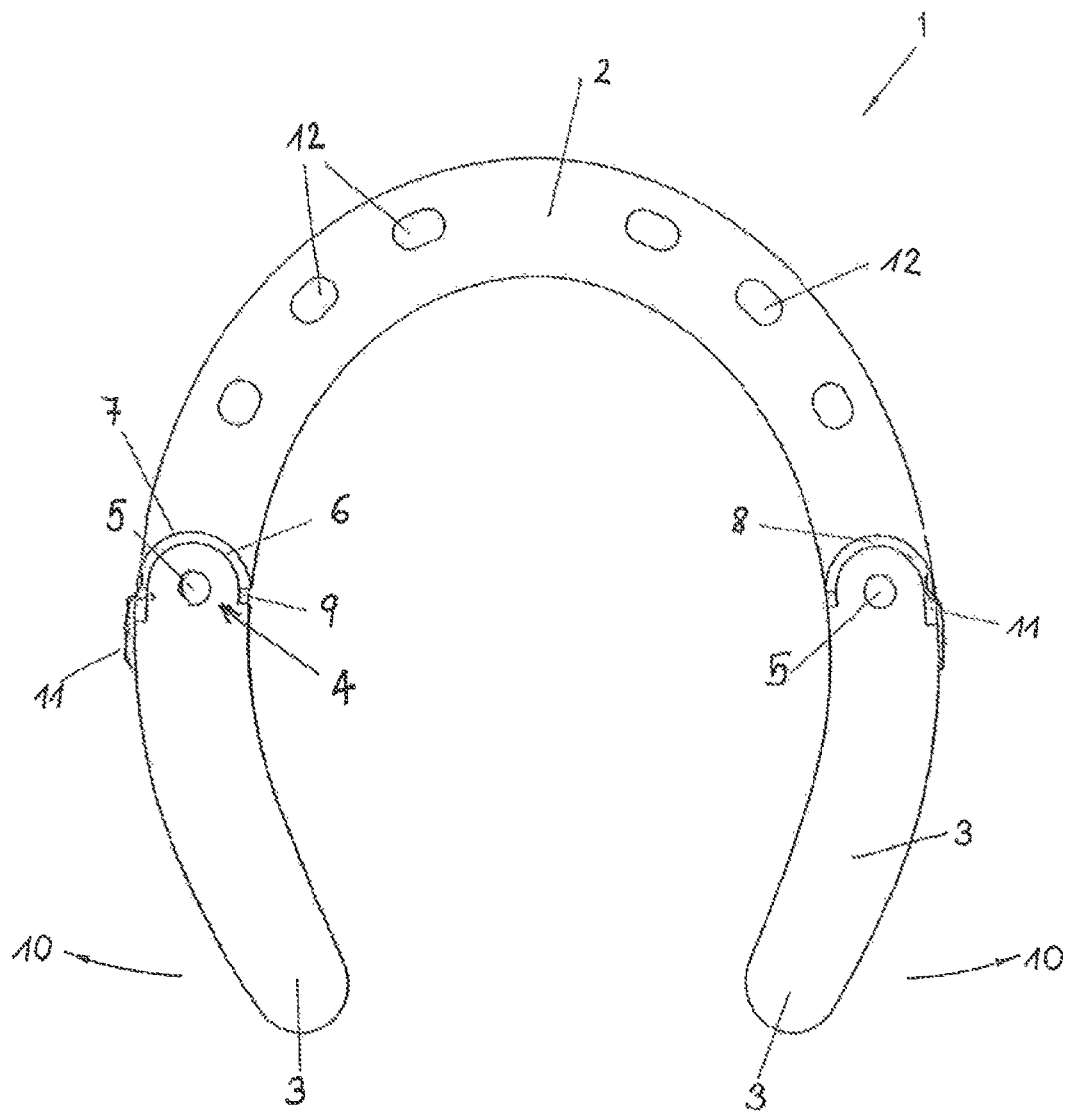
FIG. 1 illustrates a horseshoe according to the invention in the assembled state in top view, which horseshoe comprises two joint connections and leaf springs as elements providing a restoring force.

In detail, a horseshoe according to the present invention is denoted by 1 in FIG. 1, comprising a base body 2 and two rear end parts 3 that are movably fixed to end regions of the horseshoe 1 having reduced thicknesses. The movably fixed, rear end parts 3 in this case are each articulately connected by a joint connection 4 in such as manner that the movably fixed, rear end parts 3 are arranged on the base body 2, in particular in the tapered rear ends of the legs 15 of the base body 2, so as to be movable via an axis-forming pin 5, wherein the pin 5 is configured to be welded to the base body 2 or formed in one piece with the latter in order to avoid injury to the sensitive hoof sole, or sensitive hoof edge, of a riding animal, e.g. a horse, by possibly protruding parts of the pin 5.

After having fitted the rear end parts 3 onto the pin 5, the upper, free region of the pin 5 is, for instance, hammered wide or bent or ground plane in order to ensure the safe support and reliable functioning of the end parts 3 on the pins 5.

Each of the end parts 3, on its end oriented towards the base body and facing away from the ends of the legs 15 comprises a rounded end region 6 substantially corresponding to a complementary recess 7 provided in the base body 2 of the horseshoe 1. A gap 8 for an appropriate movement of the end part 3 about the pin 5 is left free between the rounded end region 6 and the recess 7. A resettable silicone or rubber element (not illustrated) can, for instance, be inserted in said gap 8 in order to safeguard the function and mobility of the end parts 3 relative to the base body 2, on the one hand, and safely inhibit any contamination of said gap 8, on the other hand, so as to safely prevent the entire horseshoe 1 from damage, and hence from functional inability.

Finally, parts 2 and 3 are each recessed such that both on the side of the horseshoe 1 oriented to the inside of the hoof and on the side of the horseshoe 1 oriented to the outside of the hoof a gap or clearance 9 is each formed to ensure the mobility of the movable end parts 3 relative to the base body 2. The clearance 9 on the side of the horseshoe 1 oriented to the interior of the hoof is formed with a smaller dimension than the clearance 9 oriented to the exterior of the hoof, since during the normal movement of a riding animal, in particular when the riding animal touches the ground, the hoof is expanded in the sense of arrow 10 so that the horseshoe 1 requires a greater freedom of motion in the sense of arrow 10 than in the opposite sense. In order to safely prevent the clearance 9 from being contaminated, a rubber element or plastic element, which is accordingly resilient, may also be inserted in the clearance 9.

In order to bring the movable end parts 3 back into a position congruent with the base body 2 after their expansion, a leaf spring 11 is each provided according to the invention on the outer side of the horseshoe 1 in the region of the joint connection 4, between the base body 2 and each movable end part 3. The leaf spring 11 is each fixed to the movable end parts 3 and retained on the inner side of the base body 2 in a recess provided to this end, in particular a blind hole, which is not illustrated in the drawing. The leaf spring 11 is inserted in such a manner as to exert a restoring force on the associated movable end part 3 in order to return the same into a position congruent with the base body 2 after its pivotal movement in the sense of arrow 10, which was caused by the riding animal touching the ground. The leaf spring 11 may be replaced with a spiral spring, which may optionally be hinged in a manner different from a leaf spring 11. Both the leaf spring 11, and optionally a spiral spring, can be countersunk in grooves provided to this end in the base body 2 and in the movable end part 3 of the horseshoe 1.

Finally, the horseshoe 1 comprises nail holes 12 in its base body 2, in particular in the region of the base body 2 which has no movably fixed end parts 3, said nail holes being necessary for fixation to a hoof of a horse (not illustrated). The nail holes 12, furthermore, may have different inclinations relative to the plane of the horseshoe 1 to comply with the hoof's anatomy. Thus, they may, for instance, comprise an angle of up to 30° in the region of the toe of a riding animal, becoming almost perpendicular to the plane of the horseshoe 1 in the region of the hoof quarters. The inclinations in horseshoes 1 for front hooves may differ from those for rear hooves. Further elements of the horseshoe 1, which are either mandatorily present or facultatively fixed thereto or formed thereon, such as upstands, recesses for studs, or even special chamfers in the running surface of the horseshoe, are not illustrated because they are not essential to the function of the present invention.

Figure 2:
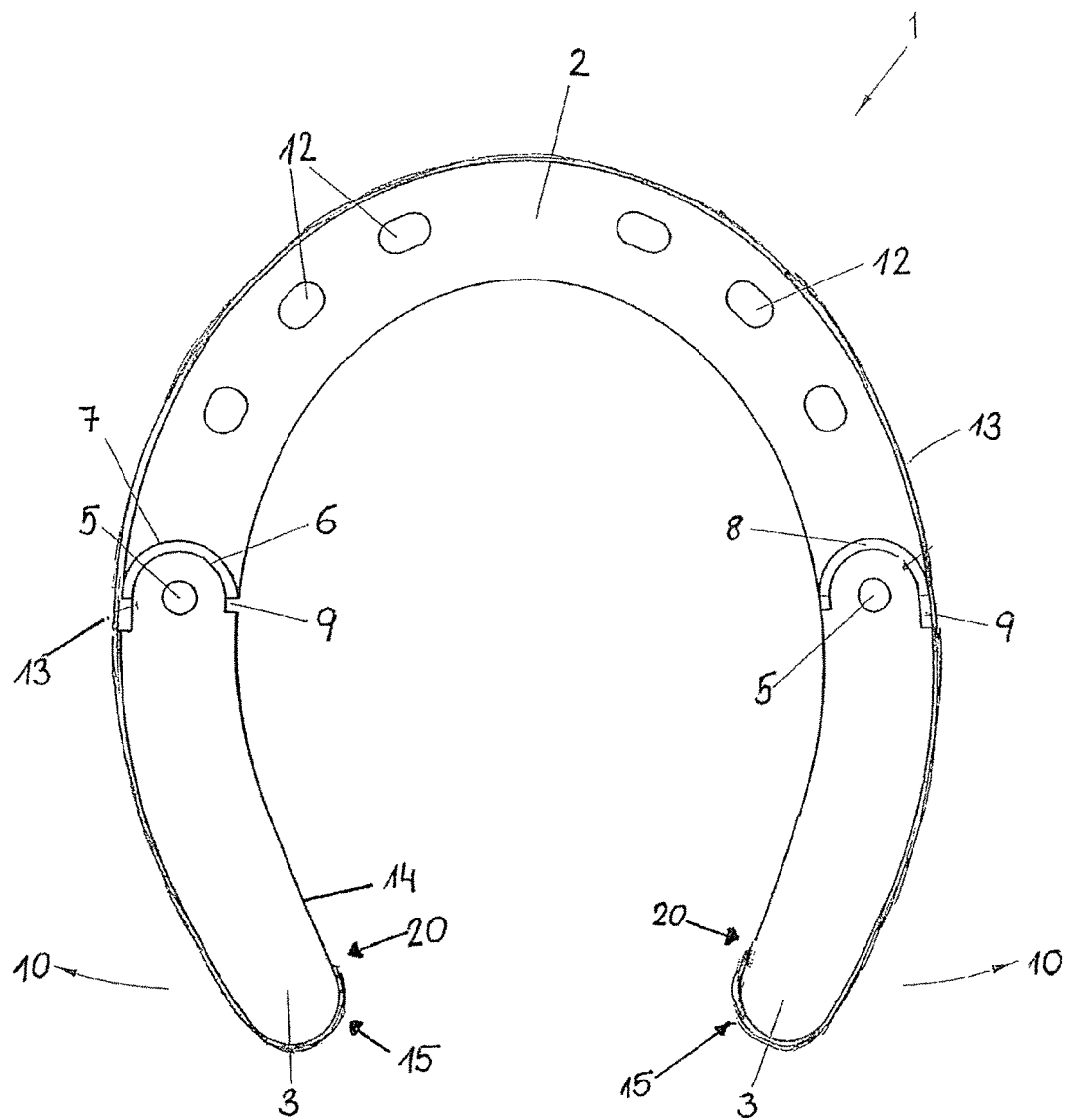
FIG. 2 illustrates a horseshoe according to the invention in the assembled state in top view, which horseshoe comprises two joint connections and a plastic strip guided around the horseshoe as an element providing a restoring force.

In the illustration according to FIG. 2, the reference numerals of FIG. 1 have been retained as far as possible. FIG. 2 depicts a horseshoe 1 in the assembled state in top view, said horseshoe comprising two movably fixed end parts 3 and a plastic strip 13 led around the horseshoe 1 as restoring-force-providing element. The plastic strip 13 is fixed, in particular detachably fixed, to the inner side 14 of the horseshoe 1, in particular in the region of the free legs 15 of the horseshoe 1, for instance in slots 20 provided to this end in the base body 2.

Instead of the fixation of the plastic strip 13 to the free legs 15 of the base body 2, the plastic strip 13 can also be designed as a self-contained element completely led around the horseshoe 1. In this case, orthopedic inlays may, for instance, also be held in the interior of the horseshoe 1 along with the plastic strip 13. Another option for resetting the movable end parts 3 with the plastic strip 13 consists in designing an appropriately strong and tight plastic strip 13 similarly as the leaf spring 11 described in FIG. 1.

In the illustration according to FIG. 3, which is a partial view of a horseshoe 1 according to FIG. 2, the movably fixed, rear end part 3 is represented in a position projecting beyond the plane of the base body 2, the reference numerals of FIG. 2 having been retained. By pivoting the movable end part 3 in the external direction, or in the sense of arrow 10, as the riding animal touches the ground, the plastic strip 13 is stretched, and when the riding animal raises its foot again, the restoring force of the plastic strip 13 acts on the movable end part 3 in the sense of arrow 19 to bring it back into its basic position, in which the movable end part 3 is arranged to directly cover the base body 2.

From FIG. 3 it is further apparent that the plastic strip 13 is fixed to the inner side 14 of the base body 2 in a recess 20 provided therefor, in particular a slot or blind hole. The fixation of the end part of the plastic strip 13 can be realized in any desired and technically feasible manner, comprising, for instance, a frictionally engaged fixation, a fixation by means of a thickened end of the plastic strip 13 in a slot widening towards inside, and the like.

In the illustration according to FIG. 4, which is a partial view of a horseshoe 1 according to FIG. 1, the movably fixed, rear end part 3 is illustrated in a position projecting beyond the plane of the base body 2, the reference numerals of FIG. 1 having been retained. By pivoting the movable end part 3 in the external direction, or in the sense of arrow 10, by the hoof of the riding animal touching the ground as the riding animal touches the ground, the leaf spring 11 is tightened, and when the riding animal raises its foot again, the restoring force of the leaf spring 11 acts on the movable end part 3 in the sense of arrow 19 to bring it back into its basic position, in which the movable end part 3 is arranged to directly cover the base body 2. In order that the movements of the movable end part 3 meet the requirements of sufficient sliding and, at the same time, sufficient holding, the movable end part 3 may also comprise at least one roughened surface, in particular on the side to the hoof of the horse.

Figure 5:
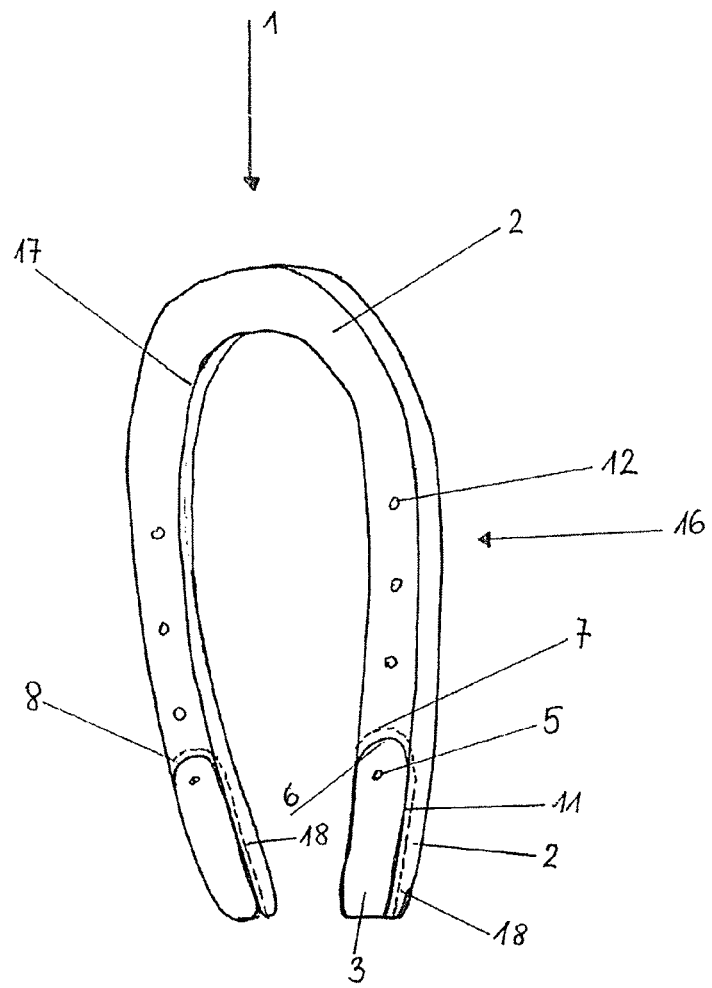
FIG. 5 depicts the horseshoe according to FIG. 1 in a perspective view from the side.

FIG. 5 depicts the horseshoe 1 of FIG. 1 in a perspective view from the side. From this Figure, it is, in particular, apparent that the base body 2 forms the entire running surface 16, and that the movable end parts 3 are arranged on offset regions, in particular regions of reduced height, of the base body 2, so that the horseshoe 1 also has a continuously uniform thickness on the hoof application side 17 facing the hoof of a riding animal. Finally, a schematically indicated slide surface 18 made of a material having a reduced friction coefficient is arranged between the movable end parts 3 and the base body 2 in order to ensure the safe and reliable functioning of the movable end parts 3 even after an extended use of the horseshoe 1.

It is obvious to the skilled artisan that a horseshoe of this type can be used both for cold shoeing and for hot shoeing, wherein no special precautionary measures are to be observed when using a metal element for exerting a restoring force. If it is desired to use a plastic strip 13 as an element exerting a restoring force on the horseshoe 1, it is preferably proceeded in such a manner that, when working on the horseshoe 1, in particular when hot-working the same, the plastic strip 13 will not be placed before working has been completed, which is why, for instance, any type of plastic strip 13, in particular strips varying in thickness and elasticity, may be chosen.

It goes without saying that the horseshoe 1 can also be designed such that a horseshoe 1 completely made of plastic is employed. Furthermore, it is, of course, also possible to use with the joint connection 4 according to the invention any glued horseshoe instead of a nailed horseshoe 1, in which case it is to be taken care that no gluing must be provided in the region of the movable end parts 3.

The invention claimed is:

1. A horseshoe for hooves of riding animals, comprising a horseshoe-shaped base body having a running side facing ground in use and a hoof application side facing the hooves of the riding animals in use, and optionally at least one upstand fixed to the base body, and two rear end parts of the horseshoe, which are movably fixed to the base body via joint connections, the base body forming the running side of the horseshoe, and the movably fixed rear end parts forming parts of the hoof application side, wherein that the joint connections are movable relative to each other in a plane of the hoof application side of the horseshoe, and wherein the joint connections are each overlapped on an outer peripheral side of the horseshoe by an element exerting a restoring force onto the movably fixed rear end parts; wherein each of the joint connections is a pin penetrating a hole on the base body; and wherein the elements exerting a restoring force are leaf springs; and wherein the leaf springs are entirely located within a horizontal plane of the outer peripheral side of the horseshoe.

2. The horseshoe according to claim 1, wherein the leaf springs are detachably connected to at least the base body.

3. The horseshoe according to claim 2, wherein the leaf springs are non-detachably connected to the movably fixed rear end parts.

4. The horseshoe according to claim 1, wherein the elements exerting the restoring force act on the movably fixed rear end parts of the horseshoe in a direction oriented to an interior of the horseshoe.

5. The horseshoe according to claim 1, wherein irregularities of the hoof application side existing in a region of the joint connections are filled with resilient silicone or rubber inserts.

6. The horseshoe according to claim 1, wherein slide surfaces of the movably fixed rear end parts, and/or slide surfaces of the base body in a region of the movably fixed rear end parts, are provided with a friction-reducing coating.

7. The horseshoe according to claim 6, wherein the friction-reducing coating is a copper plating.

\* \* \* \* \*